July 20, 1965　　　L. A. ERICKSON　　　3,195,419
TELESCOPING LOGGING TOWER
Filed July 15, 1963　　　　　　　　　　　3 Sheets-Sheet 1
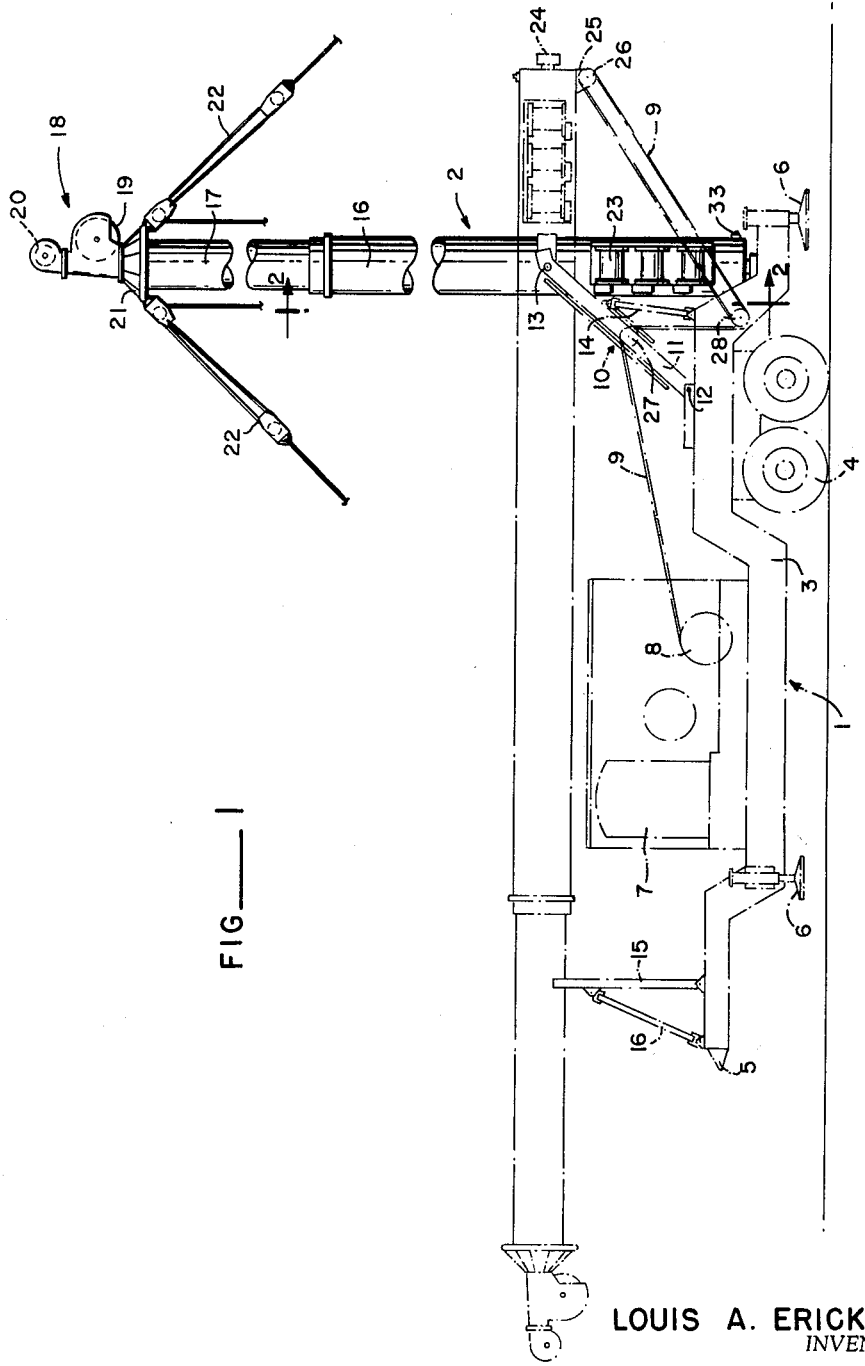
FIG.___1
LOUIS A. ERICKSON
INVENTOR.
BY Seed & Berry
ATTORNEYS

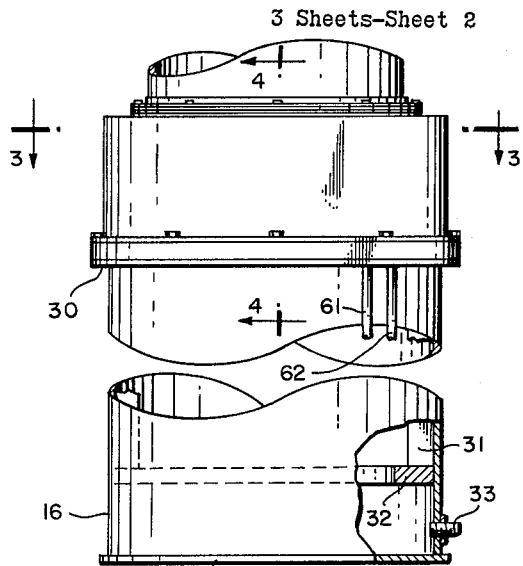
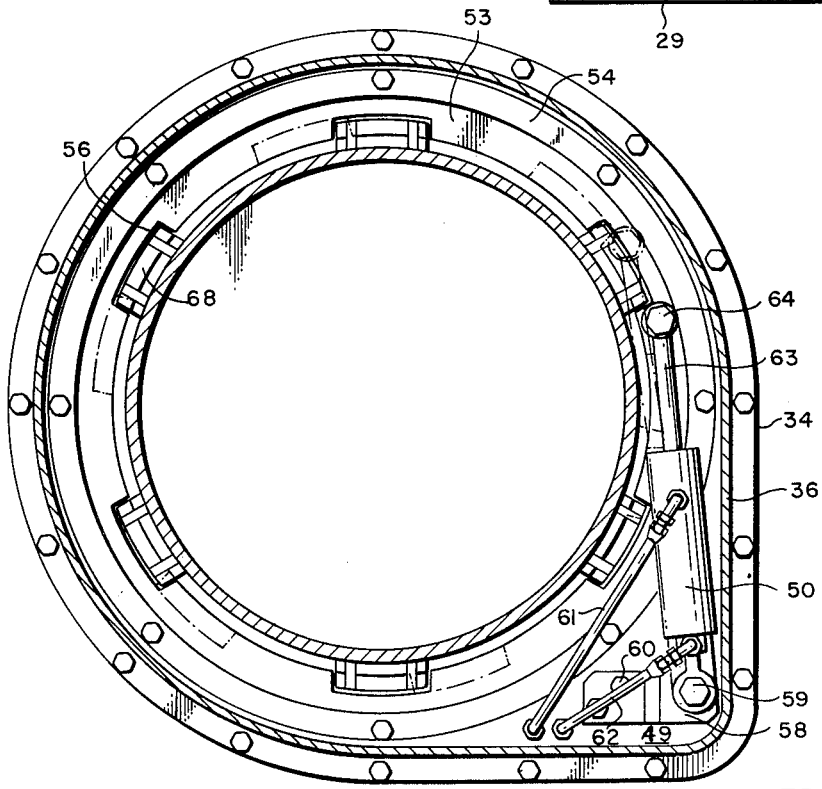

July 20, 1965
L. A. ERICKSON
3,195,419
TELESCOPING LOGGING TOWER
Filed July 15, 1963
3 Sheets-Sheet 3
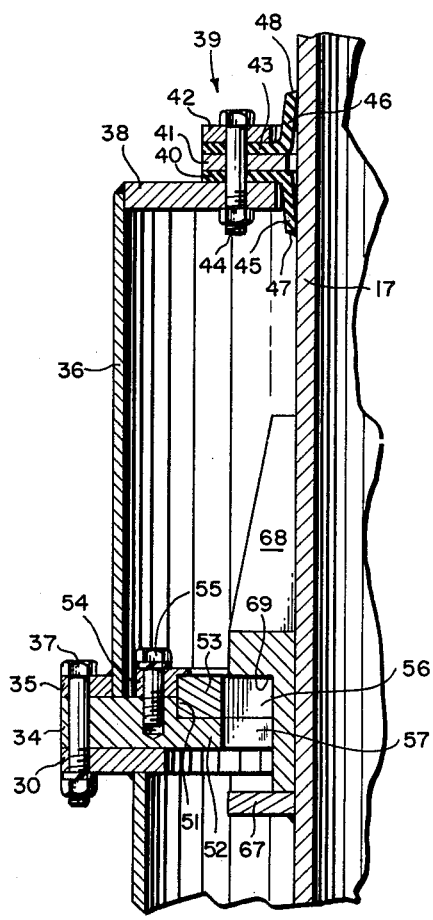
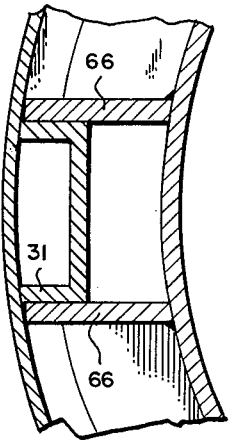
FIG. 4
FIG. 5
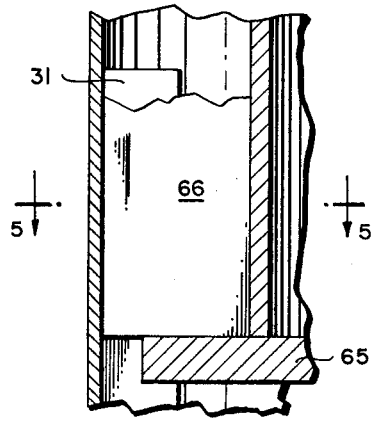
FIG. 6
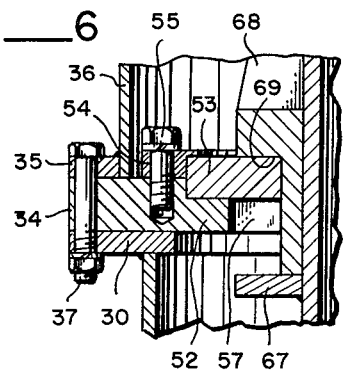
LOUIS A. ERICKSON
INVENTOR.
BY *Seed & Berry*
ATTORNEYS 3,195,419
TELESCOPING LOGGING TOWER
Louis A. Erickson, Seattle, Wash., assignor to Smith-Berger Manufacturing Corporation, Seattle, Wash., a corporation of Washington
Filed July 15, 1963, Ser. No. 294,954
11 Claims. (Cl. 92—25)

The present invention relates in general to logging equipment known in the industry as logging towers which are used for the purpose for which "spar trees" have been used in the past. The present invention is more specifiically directed to portable logging towers carried by a motor vehicle or trailer and capable of being transported in a horizontal position and moved to a substantially vertical position during use. The present invention contemplates the provision of such a portable logging tower comprising telescoping sections which may be moved to an extended position when the tower is placed in a vertical operating position.

In the prior art it has been found necessary to utilize a cumbersome and complicated system of lifting cables and pulleys in order to orient the logging tower to the vertical position and then to extend telescoping sections of the tower in place for use. Since the purpose of the portable logging tower is to accomplish the normal function of a spar tree in supporting a load sustaining cable and other lines required for carrying the rigging for the haul back line, and the securement of guy lines and the like, it becomes desirable to simplify the raising means of the logging tower and to eliminate, as far as possible, the number of cables, winding drums and sheaves. Other disadvantages in the use of multiple cable systems appear in the way of the fouling of cables and the possibility of breaking of the lifting cables under overload or after long periods of stress and wear.

The present invention eliminates all cables and lines previously used to telescope the sections of the tower and contemplates the utilization of fluid pressure means. The device of the present invention therefore eliminates the expense involved in maintaining and replacing lifting cables and associated apparatus and makes use of fluid pressure apparatus normally available on the logging site, with no other additional facilities being necessary for operation.

The primary object of the present invention, therefore, is to provide an improved portable logging tower of the type described having telescoping sections and adapted for quick and easy erection into operation position and lowering into a horizontal position for transport.

A further object of the present invention is to provide a portable logging tower wherein the tower consists of telescoping sections with fluid pressure means being utilized for telescoping the movable sections to erect the tower.

Another object of the present invention is the provision of a telescoping logging tower wherein the top section of the tower may be raised to a vertically extended position and mechanically locked into place.

Another object of the present invention is the provision of a telescoping logging tower of the type described wherein fluid motor means is utilized to operate a mechanical lock to hold the upper section of the tower in the extended or raised position.

Another object of the present invention is to provide a novel sealing means between the telescoping portions of the tower, whereby the lower section of the tower casings may be utilized as an air pressure chamber to control the position of the upper telescoping tower section.

A still further object of the present invention is to provide a novel sealing arrangement wherein the mechanical locking mechanism and the operating means therefor may be conveniently located within the fluid pressure chamber and between the telescoping sections of the tower.

The means by which the foregoing objects and advantages are accomplished are set forth in the following specification and illustrated in the accompanying drawings, in which:

FIG. 1 is a side elevation of the logging tower and its vehicle mounting with the tower illustrated in vertical position and the horidontal trailing position of the tower being indicated by the dotted line portions.

FIG. 2 is a side elevation of the section of the tower, taken along lines 2—2 of FIG. 1, which incorporates the fluid seal and the mechanical locking means with a portion of the bottom end of the tower being broken away to illustrate the details of structure.

FIG. 3 is a cross-sectional view of the tower taken along lines 3—3 of FIG. 2.

FIG. 4 is a vertical cross-sectional view of a portion of the tower illustrating the fluid seal means and the mechanical locking means.

FIG. 5 is a cross-sectional view taken along lines 5—5 of FIG. 4.

FIG. 6 is a vertical cross-sectional view of the tower casing similar to FIG. 4 and illustrating the locking ring in the locked condition.

Referring now to the drawings, wherein like reference numerals indicate identical parts, the preferred embodiment of the present invention comprises a mobile trailer unit shown in FIG. 1 which includes a trailer vehicle indicated generally by the numeral 1 which mounts the telescoping logging tower 2 of the present invention.

The trailer illustrated in FIG. 1 is a conventional structure utilized for the transportation and mounting of logging towers and includes a bed or frame 3, wheels 4, and a hitch connection 5 suitable for connection to a towing vehicle. The trailer is also conventionally equipped with front and rear ground engaging jacks 6 which serve to stabilize the trailer when the tower is in the erected position shown by the full line position in FIG. 1. An internal combustion engine or other prime mover 7 is mounted on the frame 3 of the trailer for the purpose of operating a plurality of winding drums, two of which are shown diagrammatically in FIG. 1. The details of the driving arrangement and the placement of winding drums on the trailer form no part of the present invention and it is necessary only to point out that a suitable drum such as drum 8 is powered by the engine 7 and is utilized to operate a hoisting cable 9 for erecting the tower 2 in a manner presently to be described.

A conventional A-frame 10 is mounted near the rear end of the trailer frame 3 and comprises two side arms 11, one of which is illustrated in FIG. 1. The arms 11 are spaced apart at their lower ends and pivoted to the trailer frame as illustrated by pivot pins 12. The arms 11 extend to opposite sides of the tower 2 and are pivoted to the tower on the pivot pins 13 which form the fulcrum point about which the tower is rotated from the vertical position to the dotted line horizontal position in FIG. 1. The A-frame 10 also includes support legs 14, one of which is shown in FIG. 1, for maintaining the A-frame rigid as is well understood in the art.

At the front end of the trailer frame 3, an upright supporting cradle 15 is mounted for the purpose of supporting the logging tower in its horizontal position. The upright cradle 15 is provided with suitable support legs 16 as may be required.

The logging tower 2 is made up of a first hollow cylindrical section 16 and a second cylindrical section 17 which telescopes within the section 16. The upper section 17 of the tower is equipped with a a conventional tower head assembly 18 which includes the sheaves 19 and 20 and the attaching ring 21. The actual placement and location of the sheaves and attaching ring forms no part of the present invention but it will be understood by those skilled in the art that the sheaves are used for operation of the high line and the haul back line rigging. The ring 21 serves as an attaching means for suitable guy cables 22 normally used to stabilize the tower in the erected position.

The bottom section 15 of the tower is fitted with the necessary winches 23 for operating the guy cables 22 and the various cable riggings of the outfit. On the bottom end of the section 16, a base locking member 24 may be mounted so as to engage the trailer bed or frame when the tower is rotated to the erected position. Any desirable locking mechanism, not shown, may be utilized to temporarily secure the locking member 24 to the trailer bed so as to lock the tower in the vertical position.

For the purpose of rotating the tower from the horizontal to the vertical position, a bracket 25 is welded or otherwise attached to the surface of the section 16 adjacent the bottom end thereof. The bracket 25 provides a mounting for a sheave 26 over which the cable 9 passes. In addition, a sheave 27 is carried by the A-frame 10 and a third sheave 28 is mounted on the trailer frame. As previously explained, a winding drum 8 powered by the prime mover 7 is used for hauling in the cable 9. The cable 9 may be secured at its end opposite the drum 8 to the trailer whereby the tower 2 is pivoted about the pivot point 13 as the cable 9 is hauled in by the drum 8. When it is desired to move the tower from the vertical position to the horizontal position, the guy cables 22 are released and the cable 9 is slowly let out to allow the tower to pivot about the point 13 as it moves from the full line position to the dotted line position shown in FIG. 1 with the top end of the tower resting on the cradle 15.

Turning now to the details of construction of the tower 2, the lower section 16 of the tower comprises a hollow cylindrical casing as illustrated in FIG. 2. The casing 16 is provided with a closure plate 29 for sealing off the bottom of the casing 16. The opposite end of the section 16 is open and fitted with an annular flange 30 as illustrated in detail in FIG. 4. A plurality of vertically extending guide channels 31 are welded or otherwise suitably affixed to the inner surface of the casing 16 for the purpose of guiding the telescoping upper section 17 of the tower. The number and placement of guide channels 31 may vary with any particular device and, in the alternative, various cross-sections and configurations of guides may be utilized depending upon design as desired. Two such guides are shown in FIG. 2 of the drawing.

A stop ring 32, shown in FIG. 2, is also affixed to the inner surface of the casing 16. The stop ring is located a predetermined distance above the closure plate 29 and acts as a means to limit the telescoping movement between the sections 16 and 17. It will be readily understood by those skilled in the art that alternative forms of limiting devices other than the ring 32 can be utilized, for example, individual spaced projections on the inner surface of the casing 16 will suffice.

The casing 16 is further provided with a fluid pressure fitting 33 which may be of a conventional design and well known to those skilled in the art. The fittings 33 may contain a compound check valve and flow control device or may be of a simple design to permit the flow of pressure fluid when connected to either a pneumatic or hydraulic fluid pressure source and valving system. The present invention contemplates the use of existing fluid pressure sources and valving systems normally present at logging operation sites and the details of such systems form no part of the present invention. It is only necessary to have a means for admitting and exhausing pressure fluid from the inside of the hollow casings 16 in order to accomplish the objects of the invention.

The flange 30 on the open end of the casing 16 provides a flat surface for mounting a locking ring support plate 34 and flange 35 carried by a fluid seal jacket 36. The annular support plate 34 and the flange 35 are clamped to the casing flange 30 by means of a plurality of conventional clamping bolts 37 so as to form a substantially fluid tight flange joint. Both the jacket 36 and the support plate 34 extend completely around the circumference of the flange 30 with the jacket 36 forming an extension of the pressure chamber provided by the hollow section 16. The upper end of the cylindrical jacket 36 is provided with a radially inwardly extending flange 38 to which is attached the seal and wiper assembly 39.

The assembly 39 comprises a continuous annular rubber seal 40, spacers 41 and 42 and a wiper member 43. The entire assembly is clamped to the flange 38 by means of a plurality of clamping bolts 44 as illustrated in detail in FIG. 4. The seal member 40 includes a downwardly extending sealing lip 45 and the wiper member 43 includes a similarly shaped lip 46 directed upwardly or in the opposite direction from the lip 45. As also illustrated in FIG. 4, the sealing lip 45 has a tapered edge 47 and the wiper lip 46 has a tapered edge 48.

The annular seal 40 and the wiper member 43 are preferably constructed from synthetic rubber, natural rubber, plastic or any like substance capable of deformation and suitable for performing the sealing and wiping operation. It has been found in practice that a synthetic rubber gives adequate performance and will withstand the fluid pressures required to raise the tower and also exhibits adequite wear characteristics under operating conditions.

As previously mentioned, the cylindrical jacket 36 forms an extension of the fluid pressure chamber provided by the casing section 16. The chamber provided by the jacket 36 will therefore be subjected to the fluid pressure within section 16. It will also be understood that the fluid pressure is uniform throughout the section 16 and the chamber within the jacket 36, so as to exert a uniformly distributed force on the entire outer surface of the portion of the section 17 within the pressure chamber.

As illustrated in FIG. 4, both the tapered edge 47 of the seal 40 and the edge 48 of the wiper 43 contact the outer cylindrical surface to the tower section 17. With the downwardly directed sealing lip 45 in the position shown and described, the existing fluid pressure within the section 16 and the sealing jacket 36 serves to enhance the fluid tight seal between the lip 45 and the outside surface of the section 17. With this arrangement, it has been found unnecessary to provide any additional lubrication or special coating on the outside surface of the section 17. The fluid pressure seal operates sufficiently with only the normal coating of paint on the surface of the section 17 and, as section 17 reciprocates relative to the section 16, the lip 46 on the wiper 43 prevents any foreign matter on the surface of the section 17 from passing beyond the seal and wiper assembly 39.

Referring now to FIG. 3, the lock supporting plate 34 is illustrated in plan view and is in form of a flat circular plate which includes an offset portion 49 which provides a mounting surface for the fluid pressure cylinder 50, the purpose of which is to be presently described. It will also be noted that the vertical walls of the jacket 36 follow the contour of the periphery of the plate 34 so as to completely enclose the cylinder 50 and related apparatus. The plate 34 is provided with an annular recess on the top surface of its inner peripheral edge forming an annular shoulder 51 and an inner edge 52 of reduced thickness.

A rotatable locking ring 53 is positioned within the recess on the surface of the plate 34 and bears against the shoulder 51 and the upper surface of the edge 52 of the supporting plate. The inside peripheral surface of the ring 53 coincides with the inside peripheral surface of the plate 34 with the ring 53 being retained in the recess by means of keeper ring 54 which is clamped to the plate 34 by means of bolts 55. Enough clearance is allowed between the edge of the keeper ring 54 and the locking ring 53 to allow the locking ring to freely rotate in the recess in the plate 34. As illustrated in FIGS. 3 and 4, the inner peripheral edge of the locking ring is provided with a plurality of notches 56 and the supporting plate 34 is provided with an identical set of notches 57 for a purpose to be described. As illustrated in FIG. 3, both the locking ring and the supporting plate are provided with six spaced notches around their inner peripheral edge providing a plurality of keyways when the notches in the plate and the ring are aligned as illustrated.

The power cylinder 50 is pivoted to a mounting bracket 58 by a suitable pin 59 and the bracket 58 is securely fastened to the plate 34 by means of bolts or the like 60. The power cylinder 50 is of the double-acting type controlled by means of fluid pressure lines 61 and 62 shown in FIG. 3. The operating arm 63 of the cylinder is in turn pivoted by means of the pin 64 to the top surface of the locking ring 53. With this arrangement, the locking ring 53 may be rotated relative to the support plate 34 so as to selectively align or offset the notches in the locking ring and the support plate 34. The operation of the cylinder 50 and the locking ring will be accomplished by an operator on the ground once the telescoping portions of the tower are in proper position.

Referring now to the details of construction of the upper section 17, the section is preferably in the form of a hollow cylinder the outside diameter of which is lesser than the inside diameter of the spacer ring 41 and the inside diameters of the locking ring 53 and the supporting plate 34. Sufficient clearance is provided for the section 17 to telescope within the section 16 but at the same time cooperate with the seal 40 and the wiper member 43. The bottom end of the section 17 has a closure plate 65 welded or otherwise secured thereto in fluid tight relationship for the purpose of allowing the upper section 17 to act as a movable piston member within the fluid pressure chamber provided by the casing of the section 16. For the purpose of guiding the section 17 as it reciprocates within the section 16, laterally extending peripherally spaced guide plates 66 are secured to the outer surface of the section 17 as shown in FIG. 5, with the guides 66 being located on either side of the guide channel 31 secured to the lower section 16. The guide plates 66 are also seen to extend to the inner surface of the section 16 so as to insure substantial axial alignment of the two telescoping sections as they are reciprocated. It will be readily understood that different forms of guiding means may be utilized to the end that axial alignment of the two sections is maintained.

As previously explained, the bottom closure plate 65 of the section 17 will be engaged by the stop ring 32 on the section 16 to provide a lower limit for the movement of the section 17. A second stop ring 67 is secured to the outer periphery of the section 17 and engages the bottom surface of the supporting plate 34 when the section 17 is moved to its upper limit position.

In order to provide a rigid mechanical support for the upper section 17 in its raised position, a plurality of supporting blocks 68 are secured to the outer surface of the section 17 above the stop ring 67 and are spaced so as to pass through the notches 57 in the stationary supporting plate 34 and the aligned notches 56 in the locking ring 53 as the tower is raised. As illustrated in FIGS. 4 and 6, the blocks 68 are tapered upwardly to allow clearance for the operation of the power arm 63 of the cylinder 50 and include notched lower portions which provide surfaces 69 which engage the top surface of the rotatable locking ring 53 when the locking ring is rotated so as to misalign the notches thereof with the notches 57 of the supporting plate 34. Once the section 17 has been raised and the locking ring 53 rotated, the section is then allowed to settle or lower slightly so that the surfaces 69 on the blocks 68 rest on the top of the ring 53 to support the entire weight of the upper section.

The fluid pressure actuated tower of the present invention is suitable for operation with either a source of hydraulic or pneumatic pressure as desired, with the relative size of the tower and the availability of the pressure source being the limiting factors. By way of example, an approximately 30 inch diameter lower section and an approximately 24 inch diameter upper section logging tower may be raised to full height by the use of compressed air at 30 p.s.i. Since compressed air sources as high as 160 p.s.i. are generally available on logging yards and sites, it is readily understood that the present invention provides a convenient labor saving construction for telescoping logging towers. In operation, the tower 2 is rotated from the horizontal position to the vertical position as shown in FIG. 1 by means of the cable 9 and the winding drum 8 at the control of an operator. Once the tower has been raised to vertical position and locked by a suitable base locking member, indicated at 24, fluid pressure is introduced into the fluid pressure chamber provided by the bottom section 16 through the fitting 33.

At the time fluid pressure is introduced into the lower section, the locking ring 53 is positioned with its notches 56 coinciding with the notches 57 in the supporting plate 34 and the cylinder 50 is in the retracted position shown in FIG. 3. As fluid pressure is increased in the section 16, the sealing engagement between the lip 45 of the seal 40 is enhanced by the pressure on the backside thereof and the top section 17 begins to raise. As the section 17 rises it is guided and stabilized by the engagement of the guide plates 66 with the inside surface of the section 16 and the guide channel 31 illustrated in FIGS. 4 and 5. When the section 17 has reached its upper limit, the stop ring 67 will contact the bottom surface of the supporting plate 34 and further telescoping movement will be prevented. The tower is held in this position by the fluid pressure and it will be noted that the surfaces 69 of the support blocks 68 are positioned a few inches above the top surface of the locking ring 53. When the tower is in this position the fluid pressure cylinder 50 is actuated to rotate the locking ring 53 so as to misalign the notches 56 of the ring with the notches 57 of the plate 34. After the locking ring has been thus rotated, pressure is bled off through the fitting 33 and the upper section 17 is allowed to settle or lower until the surfaces 69 of the blocks 68 come to rest on the top surface of the ring 53. This relationship is illustrated in FIG. 6. The logging tower is now mechanically locked in the full raised position and ready for use.

When it is desired to lower the tower, the reverse of the above procedure is followed. Fluid pressure is again introduced into the lower casing 16 so as to raise the upper section 17 a slight distance in order to free the locking ring 53. At this point the fluid pressure cylinder 50 is actuated to rotate the locking ring 53 and to return the notches 56 into alignment with the notches 57. With the notches being thus aligned, fluid pressure is bled off from the casing 16 and the supporting blocks 68 are allowed to pass downwardly through the aligned notches and the upper section 17 descends slowly depending upon the rate of bleed-off until the bottom plate 65 thereof comes to rest on the stop ring 32 of the casing 16. The tower 2 may then be returned to the horizontal position by unlocking the base portion 24 and operating the winding drum 8 to play out the cable 9 until the tower comes to rest against the cradle 15 on the trailer.

It will be readily understood by those skilled in the art that the present invention provides a significant advance over prior art devices in the way of time and labor saving operation of telescoping logging towers. It will also be understood that numerous modifications and alterations to the present device may be accomplished without departing from the spirit and scope of the invention. Applicant therefore intends to be limited only to a liberal interpretation of the specifications and claims.

What I claim is:

1. A telescoping logging tower comprising; a base, a first hollow cylindrical tower section, means for mounting said first section on said base in an erected position, said first section being open at the top and closed at the bottom, a second tower section telescopingly received in said first section, a flat support plate mounted on the upper end of said first section and closely surrounding said second section, a plurality of blocks secured to the outer surface of said second section, movable locking means carried by said plate for engaging said blocks to support said section in the raised position, fluid motor means mounted on said plate and connected to said locking means for selectively controlling the position thereof, an upwardly extending cylindrical jacket connected to said plate and enclosing said fluid motor means and said locking means, a continuous annular seal member mounted on said jacket and engaging said second section, said seal having one surface thereof subjected to the fluid pressure in said first section for enhancing the sealing engagement with said second section, annular wiper means carried by said jacket for engagement with said second section, said second section being movable within said first section between a lowered position and a raised position, and means for admitting and exhausting fluid pressure to said first section, whereby said second section may be moved between the raised and lowered positions.

2. A telescoping logging tower comprising; a base, a first hollow cylindrical tower section, means for mounting said first section on said base in an erected position, said first section being open at the top and closed at the bottom end thereof, a second tower section telescopingly received in said first section, seal means providing a fluid seal between said first and second sections, said second section being movable within said first section between a retracted position and an extended position, means to selectively mechanically lock said second section in the extended position, and means for admitting and exhausting fluid under pressure to said first section, whereby said second section may be moved between the retracted and extended positions.

3. The combination according to claim 2 wherein; said seal means comprises a continuous annular deformable ring having one side in contact with said second section and the opposite side thereof subjected to the fluid pressure within said first section, whereby the sealing engagement is enhanced by the fluid pressure.

4. The combination according to claim 2 wherein; a fluid seal jacket is mounted on the open end of said first section, said jacket providing a mounting means for said seal means and forming a fluid tight enclosure subjected to the fluid pressure within said first section, and motor means for operating said locking means located within said jacket.

5. A logging tower comprising; first and second telescoping tower sections, means to mount said sections in a substantially vertical erected position, means providing a fluid pressure seal between said first and second sections, said first section comprising a hollow closed cylindrical chamber surrounding said second section, means for admitting and exhausting pressure fluid to said first section whereby said section may be moved between retracted and extended positions and means for selectively mechanically locking said sections in the extended position.

6. The combination according to claim 5 wherein; said fluid pressure seal comprises a continuous annular deformable ring having a side in contact with said second section and the opposite side thereof subjected to the fluid pressure within said first section, and wiper means mounted adjacent said seal and in contact with said second section for preventing foreign matter from interfering with said seal.

7. A logging tower comprising; a base, first and second telescoping tower sections, means to mount said first section on said base in an erected position, means providing a fluid pressure seal between said first and second sections, said first section comprising a hollow closed cylindrical chamber surrounding said second section, and means for admitting and exhausting pressure fluid to said first section whereby said second section may be moved between the retracted and extended positions, and means for selectively mechanically locking said sections in the extended position.

8. The combination according to claim 7 wherein; said fluid pressure seal comprises a continuous deformable ring fixed to said first section with one side thereof in contact with said second section and the opposite side subjected to the fluid pressure within said first section, whereby the seal engagement is enhanced by the fluid pressure.

9. In a telescoping logging tower, the combination comprising; a first cylindrical tower section including a bottom closure plate, a second tower section telescopingly received in said first section, an annular support plate mounted on the open end of said first section and surrounding said second section, locking means carried by said support plate, selectively operable double acting fluid motor means operatively connected to said locking means, support blocks fixed to the surface of said second section and positioned to be engaged by said locking means, a fluid seal jacket mounted on said plate and including an annular sealing ring in continuous engagement with the outer surface of said second section, and means for admitting and exhausting pressure fluid to said first section and said jacket independent of the operation of said fluid motor, whereby said second section may be raised to an extended position by pressure fluid and mechanically locked by the operation of said motor driven locking means.

10. The combination according to claim 9 wherein; said sealing ring includes a side thereof in contact with said second section and an opposite side thereof subjected to the fluid pressure within said jacket, whereby the sealing engagement in enhanced by the fluid pressure.

11. The combination according to claim 10 wherein; said fluid motor means is mounted on said plate within said jacket and connected to said locking means for selective operation thereof.

References Cited by the Examiner

UNITED STATES PATENTS

| 2,451,888 | 10/48 | Thompson | 277—24 |
| 2,632,426 | 3/53 | Geesink | 92—17 |
| 2,715,954 | 8/55 | Rowan | 92—168 |
| 2,811,136 | 10/57 | Wescott et al. | 92—24 |

FOREIGN PATENTS 608,704    9/48    Great Britain.

RICHARD B. WILKINSON, *Primary Examiner.*